United States Patent [19]

Donbar et al.

[11] Patent Number: 4,463,146

[45] Date of Patent: Jul. 31, 1984

[54] SYNDIOTACTIC 1,2-POLYBUTADIENE SYNTHESIS PROCESS

[75] Inventors: Ken W. Donbar; John J. Barbour, both of Akron; James N. Henderson, Hudson; Anthony J. Bell, Stow, all of Ohio

[73] Assignee: The Goodyear Tire & Rubber Company, Akron, Ohio

[21] Appl. No.: 452,664

[22] Filed: Dec. 23, 1982

[51] Int. Cl.$^3$ .......................... C08F 4/70; C08F 36/06
[52] U.S. Cl. .................................. 526/142; 526/136; 526/335; 526/903; 526/904
[58] Field of Search ................ 525/269; 526/136, 903, 526/142

[56] References Cited

U.S. PATENT DOCUMENTS

| | | | |
|---|---|---|---|
| 3,336,280 | 8/1967 | Naylor | 526/142 |
| 3,661,882 | 5/1972 | Hawkins et al. | 526/335 |
| 3,778,424 | 12/1973 | Sugiura et al. | 526/136 |
| 3,845,029 | 10/1974 | Throckmorton et al. | 526/133 |
| 3,901,868 | 8/1975 | Ueno et al. | 526/136 |
| 4,051,308 | 9/1977 | Halasa | 526/136 |
| 4,153,767 | 5/1979 | Ueno et al. | 526/136 |

FOREIGN PATENT DOCUMENTS 46-9594  3/1971  Japan .................................. 526/142

*Primary Examiner*—Edward J. Smith
*Attorney, Agent, or Firm*—Alvin T. Rockhill

[57] ABSTRACT

This invention reveals a very useful process for producing polybutadiene composed essentially of syndiotactic 1,2-polybutadiene in tetrahydrofuran comprising polymerizing 1,3-butadiene in said tetrahydrofuran in the presence of (1) a catalyst composition microencapsulated in a polyene product which contains (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amines, alcohols, tertiary phosphines, ketones and N,N-dialkylamides, and (b) at least one organoaluminum compound of the formula $AlR_3$, wherein R represents a hydrocarbon radical of 1 to 6 carbon atoms; and (2) carbon disulfide. This polymerization technique is very useful in the synthesis of syndiotactic 1,2-polybutadiene which will be used in articles for packaging, transportation, or storing of foods since it employs tetrahydrofuran as its polymerization medium.

20 Claims, No Drawings

SYNDIOTACTIC 1,2-POLYBUTADIENE SYNTHESIS PROCESS

BACKGROUND OF THE INVENTION

Syndiotactic 1,2-polybutadiene is a very valuable material for use in the manufacture of food films. Methods for the synthesis of this polymer by polymerizing 1,3-butadiene monomer in hydrocarbon or halogenated hydrocarbon solvents are well-known.

A process for the preparation of 1,2-polybutadiene which comprises polymerizing 1,3-butadiene in the liquid phase, in the presence of a catalyst composition composed of:

(a) a cobalt compound
(b) an organoaluminum compound of the formula $$AlR_3$$

in which R is a hydrocarbon radical of 1-6 carbons, and (c) carbon disulfide is disclosed in U.S. Pat. No. 3,778,424, which is herein incorporated by reference in its entirety. U.S. Pat. No. 3,901,868 reveals a process for producing a butadiene polymer consisting essentially of syndiotactic 1,2-polybutadiene by the successive steps of:

(a) preparing a catalyst component solution by dissolving, in an inert organic solvent containing 1,3-butadiene, a cobalt compound, soluble in the organic solvent, such as (i) cobalt-β-diketone complex, (ii) cobalt-β-keto acid ester complex, (iii) cobalt salt of organic carboxylic acid, and (iv) halogenated cobalt-ligand compound complex, and an organoaluminum compound, (b) preparing a catalyst composition by mixing the catalyst component solution with an alcohol, ketone or aldehyde compound and carbon disulfide, (c) providing a polymerization mixture containing desired amounts of 1,3-butadiene, the catalyst composition and an inert organic solvent, and (d) polymerizing 1,3-butadiene at a temperature of −20° C. to 90° C. This patent is herein incorporated by reference in its entirety.

U.S. Pat. No. 3,901,868 indicates that the polymerization of 1,3-butadiene into syndiotactic 1,2-polybutadiene must be conducted in an inert organic solvent. The term inert organic solvent as used in U.S. Pat. No. 3,901,868 refers to an organic solvent chemically inert to all of the catalyst components used in the process of the present invention, 1,3-butadiene and the butadiene polymer. Some representative examples of inert organic solvents include aromatic hydrocarbons, aliphatic hydrocarbons, alicyclic hydrocarbons, most halogenated hydrocarbons, and mixtures of two or more of the above-mentioned compounds. The aromatic hydrocarbons may be benzene, toluene, xylenes, -ethylbenzene, diethylbenzene or isobutylbenzene; and the aliphatic hydrocarbons may be n-hexane, isohexanes, n-heptane, n-octane, isooctanes, n-decane, 2,2-dimethylbutane, petroleum ether, kerosene, petroleum spirit or petroleum naphtha, and the alicyclic hydrocarbon may be either cyclohexane or methylcyclohexane. Some representative examples of inert halogenated hydrocarbons are chlorobenzene and methylene chloride. Unfortunately, these inert organic solvents are toxic and extensive solvent removal procedures are required to remove them from polymers that are used in food-wrap films.

Obviously, the synthesis of syndiotactic 1,2-polybutadiene in a solvent that is less toxic would be very desirable. However, it has been the rule that less toxic solvents are not inert and will destroy the catalyst being used in the polymerization. For example, it is well-known that water will destroy the organoaluminum catalyst component used in such a polymerization.

It would be very desirable to use tetrahydrofuran as the polymerization medium for the synthesis of syndiotactic 1,2-polybutadiene which is used in articles for packaging, transporting or storing of foods since it is less toxic and is allowable at higher residual levels than other more toxic solvents. The problem with tetrahydrofuran is that it is not an inert organic solvent. If it is used as the solvent in such a polymerization, polymer yields will be reduced to unacceptable levels for commercial applications unless the catalyst is protected from the tetrahydrofuran by using the procedure described herein.

SUMMARY OF THE INVENTION

This invention discloses a process for producing polybutadiene composed essentially of syndiotactic 1,2-polybutadiene in tetrahydrofuran comprising polymerizing 1,3-butadiene in said tetrahydrofuran in the presence of (1) a catalyst composition which contains (a) at least one cobalt compound selected from the group consisting of (i) β-diketone complexes of cobalt, (ii) ↑-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amines, alcohols, tertiary phosphines, ketones and N,N-dialkylamides, and (b) at least one organoaluminum compound of the formula $AlR_3$ wherein R represents a hydrocarbon radical of 1 to 6 carbon atoms, wherein said catalyst composition is microencapsulated in a polyene product; and (2) carbon disulfide.

This invention also reveals a process for producing polybutadiene composed essentially of syndiotactic 1,2-polybutadiene in tetrahydrofuran comprising polymerizing 1,3-butadiene in said tetrahydrofuran in the presence of (1) a catalyst component solution which is prepared by dissolving in an inert organic solvent or tetrahydrofuran containing at least one polyene (a) at least one cobalt compound selected from the group consisting of (i) β-diketone complexes of cobalt, (ii) β-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amines, alcohols, tertiary phosphines, ketones and N,N-dialkylamides, and (b) at least one organoaluminum compound of the formula $AlR_3$ wherein R represents a hydrocarbon radical of 1 to 6 carbon atoms; and (2) carbon disulfide.

The use of tetrahydrofuran as the polymerization medium for polymerizing 1,3-butadiene into syndiotactic 1,2-polybutadiene for use in food-wrap films is preferred to using any known inert organic solvent since it is allowable in higher residual levels in such films.

DETAILED DESCRIPTION

This invention reveals a technique for "protecting" the organoaluminum catalyst component used in the synthesis of syndiotactic 1,2-polybutadiene from tetrahydrofuran which can be used as the polymerization medium in such a synthesis. Syndiotactic 1,2-polybutadiene can be synthesized in tetrahydrofuran in the presence of a catalyst composition comprising (1) an organometallic and (2) a transition metal compound which is microencapsulated in a polyene product.

These catalyst components are microencapsulated in at least one polyene product in order to protect the catalyst from the tetrahydrofuran and/or impurities present therein used as the polymerization medium in these polymerizations. It is believed that a shield is formed around the catalyst that the tetrahydrofuran and/or impurities present therein cannot readily penetrate. However, this shield or membrane is probably permeable by the monomer being polymerized. The polyene product formed, that microencapsulates the catalyst, is believed to be either a monomeric complex, an oligomer of the polyene, or a polymer of the polyene. This polyene product can be formed from the same monomer that is being polymerized into a polymer in the main polymerization or from a different polyene that is not being used in the main polymerization of this invention. Polyenes are olefins that contain 2 or more double bonds. A probable explanation of the effectiveness of this microencapsulation or shielding of the catalyst is that the polyene product comprises part of the ligand assemblage around the transition metal atom or atoms. The polyene may be bound to the metal, for example, by $\pi$-allyl bounding which is inert to tetrahydrofuran because of both steric and chemical effects of the ligand assemblage. The bond between metal and polyene, however, is readily replaced by a new $\pi$-allyl bond between metal and incoming monomer molecule, which at the same time forms a sigma bond to the displaced polyene. Then another molecule moves in to repeat this insertion process. Continuation of the process builds up a polymer molecule.

The catalyst compositions used in this invention are microencapsulated by employing a prereaction process. In this prereaction process the organometallic component and the transition metal compound component of the catalyst composition are dissolved in an inert organic solvent or tetrahydrofuran with at least one polyene monomer. For a given organometallic/transition metal catalyst to be effective for polymerization in the presence of tetrahydrofuran, the catalyst components must be chosen and assembled in such a way that the catalyst is encapsulated or shielded and yet accessible to monomer. More particularly, catalysts are described in this invention which are and accessible to butadiene monomer so that crystalline syndiotactic 1,2-polybutadiene is produced in high yield in tetrahydrofuran.

This invention can be easily utilized by employing a process for producing polybutadiene composed essentially of syndiotactic 1,2-polybutadiene, comprising the steps of:

(A) preparing a catalyst component solution by dissolving, in an inert organic solvent or tetrahydrofuran containing 1,3-butadiene (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amines, alcohols, tertiary phosphines, ketones, and N,N-dialkylamides, and (b) at least one organoaluminum compound of the formula $AlR_3$, wherein R represents a hydrocarbon radical of 1 to 6 carbon atoms;

(B) preparing a reaction mixture by mixing said catalyst component solution with a 1,3-butadiene/tetrahydrofuran mixture containing desired amounts of said 1,3-butadiene;

(C) preparing a polymerization mixture by mixing carbon disulfide throughout said reaction mixture, and (D) polymerizing said 1,3-butadiene in said polymerization mixture into polybutadiene while agitating said polymerization mixture.

The polymer produced by the process of the present invention is composed essentially of syndiotactic 1,2-polybutadiene and generally has a melting point of 70° C. to 180° C. The crystallinity and melting point of the polybutadiene produced by using this process can be controlled by adding soluble alcohols, ketones, nitriles, aldehydes or amides to the polymerization mixture.

In the first step of this synthesis of syndiotactic 1,2-polybutadiene, a catalyst component solution is prepared by dissolving at least one cobalt compound and at least one organoaluminum compound in an inert organic solvent or tetrahydrofuran containing at least one polyene monomer dissolved therein.

The term "an inert organic solvent" used herein refers to an organic solvent chemically inert to all of the catalyst components used in the process of the present invention, 1,3-butadiene and the butadiene polymer. Some representative examples of inert organic solvents include aromatic hydrocarbon, aliphatic hydrocarbons, alicyclic hydrocarbons, halogenated hydrocarbons, and mixtures of two or more of the above-mentioned compounds. The aromatic hydrocarbons may be benzene, toluene, xylenes, ethylbenzene, diethylbenzene or isobutylbenzene; and the aliphatic hydrocarbons may be n-hexane, isohexanes, n-heptane, n-octane, isooctanes, n-decane, 2,2-dimethylbutane, petroleum ether, kerosene, petroleum spirit or petroleum naphtha, and the alicyclic hydrocarbon may be either cyclohexane or methylcyclohexane. Some representative examples of inert halogenated hydrocarbons are chlorobenzene and methylene chloride. Tetrahydrofuran is not an inert organic solvent but it can also be used as the solvent for the preparation of the catalyst component solution, in which case the melting temperature of the polymer formed is lower than that of the polymer formed when an inert solvent, such as hexane, is used.

The cobalt compound usable for the process of the present invention is soluble in an inert organic solvent selected from the group consisting of i. $\beta$-diketone complexes of cobalt;
ii. $\beta$-keto acid ester complexes of cobalt;
iii. cobalt salts of organic carboxylic acid having 1 to 25 carbon atoms, and
iv. complexes of halogenated cobalt compounds of the formula: $CoX_n$ wherein X represents a halogen atom and n represents 2 or 3, with an organic compound selected from the group consisting of tertiary amines, alcohols, tertiary phosphines, ketones and N,N-dialkylamides.

The β-diketone compound to form a complex with a cobalt atom is of the formula:

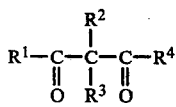

wherein $R^1$ and $R^4$, which are the same as or different from one another, are an alkyl radical of 1 to 6 carbon atoms and $R^2$ and $R^3$, which are the same as or different from one another, are a hydrogen atom or an alkyl radical having 1 to 6 carbon atoms. This type of β-diketone complex of cobalt may be cobalt (II) acetylacetonate or cobalt (III) acetylacetonate.

The β-keto acid ester to form a complex with a cobalt atom may be of the formula:

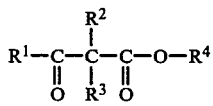

wherein $R^1$, $R^2$, $R^3$ and $R^4$ are the same as defined above. This type of cobalt complex may be a cobalt-acetoacetic acid ethyl ester complex.

The cobalt salt of organic carboxylic acid may be either cobalt octoate or cobalt naphthenate.

In the ligand compounds capable of forming a complex with a halogenated cobalt compound, the tertiary amine may be pyridine, triethylamine, tributylamine or dimethylaniline, the alcohol may be methyl alcohol or ethyl alcohol, the tertiary phosphine may be trimethyl phosphine, tributyl phosphine or triphenyl phosphine, the ketone may be acetone or methyl ethyl ketone and the N,N-dialkylamide may be N,N-dimethylformamide, N,N-dimethylacetamide, N,N-diethylformamide or N,N-diethylacetamide. The complex of halogenated cobalt is preferably either a complex of cobalt chloride with pyridine or ethyl alcohol.

The organoaluminum compound usable for the process of the present invention is of the formula $AlR_3$ wherein R represents a hydrocarbon radical of 1 to 6 carbon atoms. The hydrocarbon radical may be an alkyl, cycloalkyl or aryl radical of 1 to 6 carbon atoms. Preferably, the organoaluminum compound may be trimethylaluminum, triethylaluminum, tributylaluminum, or triphenylaluminum.

In the preparation of the catalyst component solution, it is important that the cobalt compound and the organoaluminum compound are dissolved in the inert organic solvent containing at least one polyene. Some polyenes that can be used in the formation of the polyene products used to prepare microencapsulated catalysts are 1,3-butadiene, 1,3-pentadiene, 1,5-hexadiene, isoprene, myrcene, and 1,5-cyclooctadiene. Polyenes in which at least two of the double bonds are conjugated and which have minimal substitution on the double bonds are preferred, particularly 1,3-butadiene. Other olefins which can be used are those which are capable of serving as chelating agents for transition metals, such as 1,5-cyclooctadiene. Polyenes with neither conjugation nor good chelating potential are much less effective. If the preparation is carried out in the absence of a polyene, the resultant catalyst component solution is not effective as a component of the catalyst composition of the present invention. The polyene is preferably used in a ratio by mole of at least 1.0, more preferably, at least 5.0 to the amount by mole of the cobalt compound to be used in the catalyst component solution. The preferred polyenes for use in this invention are 1,3-butadiene, 1,3-pentadiene, 1,5-hexadiene, isoprene, and myrcene. The most preferred polyene is 1,3-butadiene.

Generally, the larger the ratio of the amount of polyene to the cobalt compound in the catalyst component solution, the higher the activity of the catalyst. However, the activity of the catalyst reaches a maximum value at a ratio by mole of polyene monomer to the cobalt compound used in the catalyst component solution of between 10 and 200. For example, if a molar ratio of polyene monomer to the cobalt compound of 10,000 is employed the activity of the catalyst will be similar to that of the catalyst prepared from a catalyst component solution containing a ratio of polyene monomer to the cobalt compound of from 10 to 200. If the ratio is less than 1.0, the resultant catalyst composition has poor activity.

The catalyst component solution is preferably prepared at a temperature of 10° to 50° C. and preferably contains 0.001 to 0.5 by mole, more preferably 0.002 to 0.1% by mole, of the cobalt compound, based on the amount by mole of 1,3-butadiene to be polymerized. The ratio by mole of the organoaluminum compound to the cobalt compound is preferably in a range from 0.2 to 50, more preferably, from 0.5 to 10.

In the preparation of the catalyst component solution it is preferred for the cobalt compound to be first dissolved in the inert organic solvent in the presence of the polyene monomer and then for the organoaluminum compound to be added to the solution. However, very satisfactory results can also be obtained when the organoaluminum compound is added first.

In the preparation of this catalyst component solution the organoaluminum compound should not be allowed to come in contact with water. This is because water can completely decompose such organoaluminum compounds. Accordingly, it is preferable that the inert organic solvent to be used to prepare the catalyst component solution be preliminarily dehydrated at least up to a content of water which is insufficient to completely decompose the entire amount of the organoaluminum compound.

It is preferable that the catalyst component solution be prepared using a dehydrated inert organic solvent. However, a trace of water in the inert organic solvent can be present up to a concentration of about 500 ppm (parts per million by weight). In fact, it is believed that the total elimination of water from such a catalyst component solution is undesirable. It is preferred for no more than 200 ppm of water to be present in the inert organic solvent used in the preparation of the catalyst component solution. If the content of water in the inert organic solvent is larger than 500 ppm, the catalyst component solution has to contain a relatively large amount of the cobalt compound and organoaluminum compound. This results in an economic disadvantage. If too much water is present in the inert organic solvent used in the preparation of the catalyst component solution, the catalyst can be completely destroyed.

Similarly, when tetrahydrofuran is used as the solvent for preparing the catalyst component solution or as the polymerization medium, it is necessary that it be pure. Usually purification of the tetrahydrofuran will be required. For example, peroxides and similar impurities can be removed by distillation from solid lithium aluminum hydride under nitrogen. The distillate (purified tetrahydrofuran) should be kept under nitrogen and passed over alumina and silica immediately before use.

It is desirable to allow the prereaction used in the preparation of the catalyst component solution to run for a period of at least 30 seconds, and more preferably for at least 1 minute before mixing the catalyst component solution with the 1,3-butadiene/tetrahydrofuran mixture to form the reaction mixture. Longer time periods can be used without the catalyst component solution losing its activity.

After the organoaluminum compound has been incorporated in the catalyst component solution using the above-described technique the catalyst is "protected" from decomposition by tetrahydrofuran and/or impurities present therein. This is believed to be due to a microencapsulation of the catalyst by polyene product formed in the prereaction process used in the preparation of the catalyst component solution.

It is believed that a shield is formed around the catalyst; however, this shield or membrane is probably permeable by the butadiene monomer being polymerized into the syndiotactic 1,2-polybutadiene. When 1,3-butadiene is used as the polyene, the butadiene product which microencapsulates the catalyst is believed to be a butadiene monomer complex, an oligomerized butadiene or a polymer of butadiene. It has been determined that this protection is sufficient to allow for the use of this catalyst component solution in the suspension polymerization of butadiene into 1,3-polybutadiene of syndiotactic crystallinity in tetrahydrofuran.

In the second step of this process a reaction mixture is prepared by mixing the catalyst component solution with a 1,3-butadiene/tetrahydrofuran mixture. This 1,3-butadiene/tetrahydrofuran mixture can contain from as little as about 2% butadiene to as much as about 50% butadiene by weight. It is preferred for this 1,3-butadiene/tetrahydrofuran mixture to contain from 15% to 35% by weight butadiene and it is more preferred for it to contain about 20 to 25% butadiene by weight. Since 1,3-butadiene is very volatile it will be necessary to prepare this mixture in a closed system. Agitation should be provided in the preparation of the reaction mixture in order to insure that the catalyst component solution and 1,3-butadiene are distributed essentially homogeneously throughout the mixture.

In the third step of this process, a polymerization mixture is prepared by mixing carbon disulfide throughout the above-described reaction mixture. The amount of carbon disulfide added can range from 25% to 200,000% or higher by mole based on the amount by mole of cobalt compound with the yield of polymer product increasing as the level of carbon disulfide relative to cobalt compound is increased. Generally, it is best to operate at a level of 200% to 50,000% of carbon disulfide to cobalt compound by mole. It is more preferred to operate at a level of 1000% to 10,000% of carbon disulfide to cobalt compound by mole.

In the process of the present invention the crystallinity and melting point of the polybutadiene produced can be controlled by adding alcohols, ketones, nitriles, aldehydes, or amides to the polymerization mixture. A detailed description of the agents and techniques that are used to control crystallinity and melting points is given in United States Patents 3,901,868 and 4,153,767. These patents are incorporated herein by reference in their entirety.

In the final step of this process the 1,3-butadiene monomer in the polymerization mixture is converted into polybutadiene while agitating the polymerization mixture. If the use of an antioxidant is desired, it may be added conveniently at the beginning of the polymerization. This polymerization of 1,3-butadiene monomer can be carried out at a temperature from about $-20°$ C. to about 50° C. It is preferable for the polymerization temperature to be from 0° to 30° C. The most preferred polymerization temperature is about 20° C.

This polymerization can be carried out either under a normal pressure or in a pressurized system. This polymerization can be carried out under a nitrogen atmosphere with good results. Such a polymerization can be run for a period of from about 1 to about 30 hours. It is generally preferred for the polymerization to be run for about 10 hours. However, the optimum polymerization time will vary greatly with the polymerization temperature, catalyst, the amount of catalyst used, etc. The higher melting polybutadienes formed using the process of this invention normally will be insoluble in the polymerization mixture and can easily be recovered.

DESCRIPTION OF THE PREFERRED EMBODIMENTS

Various embodiments of the process of the present invention in practice are illustrated by the following working examples. These examples are intended merely to illustrate the present invention and not in any sense to limit the scope in which the present invention can be practiced. Unless specifically indicated otherwise, parts and percentages are given by weight.

EXAMPLE 1

A typical polymerization utilizing the process of this invention was carried out by preparing a 1.85 M (molar) solution of butadiene in hexane under a nitrogen atmosphere. 22.5 ml (milliliters) of this solution was added to a 4 oz (118 ml) bottle. 5.53 ml of a 1.52 M triethylaluminum in hexane solution was added to the bottle. 0.80 ml of a 2.09 M solution of cobalt octoate in mineral spirits was then added. The bottle was then placed on a shaker for a period of about one hour at room temperature in order to form the catalyst component solution.

A reaction mixture was prepared by adding 0.58 ml of the aforementioned catalyst component solution to a 4 oz (118 ml) bottle containing 100 ml of a 1.85 M 1,3-butadiene solution in tetrahydrofuran. The polymerization mixture was then prepared by adding 0.49 ml of a 0.10 M solution of carbon disulfide in hexane to the aforementioned reaction mixture. Thus, this reaction mixture contained a total catalyst level of 0.17 phm (parts per hundred parts of monomer). The bottle was then placed in a constant temperature bath and tumbled at 25° C.

After the polymerization was run for a period of 21 hours, the bottle was removed from the constant temperature bath. The polybutadiene that was obtained was then soaked in 300 ml of a 1 percent solution of 2,6-di-tert-butyl-p-cresol in methanol. The polybutadiene was washed two times with such a methanol solution, the liquor was decanted and the polymer was vacuum dried at 90° C. The yield of polymer was determined to be 89 percent. Using differential scanning calorimetry, two peak melting temperatures were found at 163° C. and 174° C.

This example shows that tetrahydrofuran can be used as the solvent for the synthesis of syndiotactic 1,2- polybutadiene when the catalyst is protected by prereacting it utilizing hexane as the insert organic solvent.

EXAMPLE 2

The procedure specified in Example 1 was utilized in this synthesis of syndiotactic 1,2-polybutadiene except that tetrahydrofuran was employed as the solvent for preparing the catalyst component solution in place of the hexane. The yield of polymer was determined to be 88% and its peak melting temperature was determined to be 170° C.

This example proves that tetrahydrofuran can be used as the solvent in the prereaction used in the formation of the catalyst component solution. Tetrahydrofuran can effectively be used as the solvent for both the catalyst component solution and the reaction mixture.

EXAMPLE 3

The procedure specified in Example 1 was utilized in this synthesis of 1,2-polybutadiene except that the catalysts were added in situ (the prereaction procedure used in the preparation of a catalyst component solution was not utilized) to form the reaction mixture. The yield of polymer was only 10% and the peak melting temperature of the syndiotactic 1,2-polybutadiene formed was 167° C.

This example shows that if the catalyst is not "protected" by using the prereaction procedure described herein from the tetrahydrofuran used as the medium for the polymerization that yields will be reduced to 10%. Thus, the polymer yield in such a polymerization can be increased by more than 800% if the catalysts are "protected" by employing the technique described herein. This example also shows that tetrahydrofuran is not an inert organic solvent since it will reduce polymer yields to an unacceptable level (10%) if it is employed as the polymerization medium with the catalyst being added in situ.

EXAMPLE 4

The procedure specified in Example 1 was utilized in this synthesis of syndiotactic 1,2-polybutadiene except that hexane was utilized as the polymerization medium in place of tetrahydrofuran. The yield of polymer was determined to be 34% and its peak melting temperature was found to be 208° C.

This example demonstrates the fact that when tetrahydrofuran is employed as the polymerization medium that polymer yields are substantially increased over using hexane as the polymerization medium. The yield in Example 1 which employs tetrahydrofuran as the polymerization medium is over 2½ times the yield obtained in Example 4 which employs hexane as the polymerization medium.

EXAMPLE 5

The procedure specified in Example 1 was utilized in this synthesis of 1,2-polybutadiene except that tetrahydrofuran was employed as the solvent for preparing the catalyst component solution in place of hexane and that hexane was utilized as the polymerization medium in place of tetrahydrofuran. The yield of polymer was determined to be 30 percent and two peak melting temperatures were found at 168° C. and 178° C.

EXAMPLE 6

The procedure specified in Example 1 was utilized in this synthesis except that the catalyst level was increased to 0.51 phm with the ratio of the various catalyst components remaining the same. The yield of polymer was determined to be 82%.

EXAMPLE 7

The procedure specified in Example 2 was utilized in this synthesis except that the catalyst level was increased to 0.51 phm with the ratio of the various catalyst components remaining the same. The yield of polymer was determined to be 87%.

EXAMPLE 8

The procedure specified in Example 7 was repeated with the polymer yield in this case being 65%.

EXAMPLE 9

The procedure specified in Example 3 was utilized in this synthesis except that the catalyst level was increased to 0.51 phm with the ratio of the various catalyst components remaining the same. The yield of polymer was only 13% which again shows that tetrahydrofuran is not in inert organic solvent.

While certain representative embodiments and details have been shown for the purpose of illustrating the invention, it will be apparent to those skilled in this art that various changes and modifications may be made therein without departing from the scope of the invention.

What is claimed is:

1. A process for producing polybutadiene composed essentially of syndiotactic 1,2-polybutadiene in a tetrahydrofuran polymerization medium comprising polymerizing 1,3-butadiene in said tetrahydrofuran polymerization medium in the presence of (1) a catalyst composition microencapsulated in a polyene product which contains (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amines, alcohols, tertiary phosphines, ketones and N,N-dialkylamides, and (b) at least one organoaluminum compound of the formula $AlR_3$, wherein R represents a hydrocarbon radical of 1 to 6 carbon atoms; and (2) carbon disulfide.

2. A process for producing polybutadiene composed essentially of syndiotactic 1,2-polybutadiene in a tetrahydrofuran polymerization medium comprising polymerizing 1,3-butadiene in said tetrahydrofuran polymerization medium in the presence of (1) a catalyst component solution which is prepared by dissolving in an inert organic solvent or tetrahydrofuran, containing at least one polyene (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amines, alcohols, tertiary phosphines, ketones and N,N-dialkylamides, and (b) at least one organoaluminum compound of the formula $AlR_3$ wherein R represents a hydrocarbon radical of 1 to 6 carbon atoms; and (2) carbon disulfide.

3. A process for producing polybutadiene composed essentially of syndiotactic 1,2-polybutadiene utilizing tetrahydrofuran as the polymerization medium, comprising the steps of:
  (A) preparing a catalyst component solution by dissolving, in an inert organic solvent or tetrahydrofuran containing 1,3-butadiene, (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amines, alcohols, tertiary phosphines, ketones and N,N-dialkylamides, and (b) at least one organoaluminum compound of the formula $AlR_3$ wherein R represents a hydrocarbon radical of 1 to 6 carbon atoms;
  (B) preparing a reaction mixture by mixing said catalyst component solution with a 1,3-butadiene/tetrahydrofuran mixture containing about 2% to about 50% 1,3-butadiene by weight;
  (C) preparing a polymerization mixture by mixing carbon disulfide throughout said reaction mixture; and
  (D) polymerizing said 1,3-butadiene in said polymerization mixture into polybutadiene while agitating said polymerization mixture.

4. A process as specified in claim 1 wherein said polyene product is a product of at least one polyene selected from the group consisting of butadiene, 1,3-pentadiene, 1,5-hexadiene, isoprene, and mycrene.

5. A process as specified in claim 2 wherein said polyene is at least one member selected from the group consisting of butadiene, 1,3-pentadiene, 1,5-hexadiene, isoprene and mycrene.

6. A process as specified in claim 1 wherein said polyene product is a product of a conjugated polyene.

7. A process as specified in claim 2 wherein said polyene is a conjugated polyene.

8. A process as specified in claim 3 wherein the process of polymerizing said 1,3-butadiene is carried out at a temperature of from about $-20°$ C. to about $50°$ C.

9. A process as specified in claim 8 wherein the process of polymerizing said 1,3-butadiene is carried out at a temperature of from $0°$ C. to $30°$ C.

10. A process as specified in claim 9 wherein the process of polymerizing said 1,3-butadiene is carried out at a temperature of about $20°$ C.

11. A process as specified in claim 3 wherein said catalyst component solution is prepared in tetrahydrofuran.

12. A process as specified in claim 3 wherein said catalyst component solution is prepared by first dissolving said cobalt compound into said inert organic solvent containing 1,3-butadiene and secondly, dissolving said organoaluminum compound into said inert organic solvent containing said 1,3-butadiene and said cobalt compound.

13. A process as specified in claim 3 wherein said catalyst component solution is prepared at a temperature of $10°$ to $50°$ C.

14. A process as specified in claim 3 wherein the 1,3-butadiene/tetrahydrofuran mixture contains from 15% to 35% 1,3-butadiene by weight.

15. A process as specified in claim 14 wherein the 1,3-butadiene/tetrahydrofuran mixture contains about 20% to 25% 1,3-butadiene by weight.

16. A process as specified in claim 3 wherein said inert organic solvent contains at most 500 ppm of water based on the weight of said inert organic solvent.

17. A process as specified in claim 16 wherein said amount of water is at most 200 ppm based on the weight of said inert organic solvent.

18. A process as specified in claim 3 wherein said catalyst component solution contains 0.001% to 0.5% by mole of said cobalt compound based on the amount by mole of said 1,3-butadiene to be polymerized in said polymerization mixture and 0.2 to 50 moles of said organoaluminum compound per mole of said cobalt compound and wherein said polymerization mixture contains at least 25 mole percent carbon disulfide, based on the amount by mole of said cobalt compound in said polymerization mixture.

19. A process as specified in claim 18 wherein said catalyst component solution contains 0.002% to 0.1% by mole of said cobalt compound based on the amount by mole of said 1,3-butadiene to be polymerized in said polymerization mixture and 0.5 to 10 moles of said organoaluminum compound per mole of said cobalt compound and wherein said polymerization mixture contains from 200 to 50,000 mole percent carbon disulfide, based on the amount by mole of said cobalt compound in said polymerization mixtures.

20. A process as specified in claim 3 wherein said cobalt salt is either cobalt octoate or cobalt naphthenate and wherein said organoaluminum compound is selected from the group consisting of trimethylaluminum, triethylaluminum, tributylaluminum and triphenylaluminum.

* * * * *